(12) United States Patent
Wulff

(10) Patent No.: US 7,822,513 B2
(45) Date of Patent: Oct. 26, 2010

(54) SYSTEM AND METHOD FOR MONITORING A MOBILE COMPUTING PRODUCT/ARRANGEMENT

(75) Inventor: Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 549 days.

(21) Appl. No.: 11/190,246

(22) Filed: Jul. 27, 2005

(65) Prior Publication Data

US 2007/0027585 A1 Feb. 1, 2007

(51) Int. Cl.
*G06F 17/00* (2006.01)

(52) U.S. Cl. .............................. 701/1; 701/36
(58) Field of Classification Search ............... 701/1, 701/36, 70; 345/156, 158, 173; 340/463, 340/467, 500
See application file for complete search history.

(56) References Cited

U.S. PATENT DOCUMENTS

| | | | |
|---|---|---|---|
| 4,862,298 A | 8/1989 | Genheimer et al. | |
| 5,148,153 A | 9/1992 | Haymond | |
| 5,227,929 A | 7/1993 | Comerford | |
| 5,235,472 A | 8/1993 | Smith | |
| 5,276,916 A | 1/1994 | Pawlish et al. | |
| 5,373,213 A | 12/1994 | Smith | |
| 5,392,290 A | 2/1995 | Brown et al. | |
| 5,436,838 A | 7/1995 | Miyamori | |
| 5,441,300 A | 8/1995 | Yokota et al. | |
| 5,490,411 A | 2/1996 | Hogan | |
| 5,521,772 A | 5/1996 | Lee et al. | |
| RE35,269 E | 6/1996 | Comerford | |
| 5,537,270 A | 7/1996 | Morehouse et al. | |
| 5,835,298 A | 11/1998 | Edgerton et al. | |
| 6,052,641 A * | 4/2000 | Wuerth et al. | 701/70 |
| 6,246,862 B1 | 6/2001 | Grivas et al. | |
| 6,283,375 B1 | 9/2001 | Wilz et al. | |
| 6,290,134 B1 | 9/2001 | Rando et al. | |
| 6,330,497 B1 * | 12/2001 | Obradovich et al. | 701/1 |
| 6,457,134 B1 | 9/2002 | Lemke et al. | |
| 6,664,744 B2 * | 12/2003 | Dietz | 315/291 |
| 6,937,281 B1 | 8/2005 | Ogawa | |
| 6,956,564 B1 | 10/2005 | Williams | |
| 7,024,031 B1 | 4/2006 | Castellanos et al. | |
| 7,102,626 B2 * | 9/2006 | Denny, III | 345/179 |
| 7,289,102 B2 | 10/2007 | Hickley et al. | |

(Continued)

FOREIGN PATENT DOCUMENTS

CN 1278348 A 12/2000

(Continued)

OTHER PUBLICATIONS

International Search Report of May 13, 2008 in related case PCT/US05/10971.

(Continued)

*Primary Examiner*—Yonel Beaulieu

(57) ABSTRACT

Described is a mobile computing arrangement having a sensor detecting first motion data of the arrangement and a memory to store second motion data, the second motion data including a threshold value. A comparison module compares the first motion data to the second motion data and an actuation module initiates an action for the arrangement when the first motion data exceeds the threshold value.

18 Claims, 4 Drawing Sheets

U.S. PATENT DOCUMENTS

| | | | |
|---|---|---|---|
| 7,301,529 | B2 | 11/2007 | Marvit et al. |
| 7,305,146 | B2 | 12/2007 | Cheatle |
| 7,389,933 | B2 | 6/2008 | Wang |
| 7,401,300 | B2 | 7/2008 | Nurmi |
| 7,432,911 | B2* | 10/2008 | Skarine ............... 345/168 |
| 7,440,847 | B2 | 10/2008 | Unuma et al. |
| 7,498,951 | B2* | 3/2009 | Wardimon ............... 340/691.3 |
| 7,539,576 | B2 | 5/2009 | Ohnishi et al. |
| 2001/0013854 | A1* | 8/2001 | Ogoro ............... 345/102 |
| 2002/0111737 | A1 | 8/2002 | Hoisko |
| 2002/0165662 | A1 | 11/2002 | Maruyama et al. |
| 2002/0186878 | A1 | 12/2002 | Hoon et al. |
| 2003/0093216 | A1 | 5/2003 | Akiyama |
| 2003/0105983 | A1 | 6/2003 | Brakmo et al. |
| 2003/0122804 | A1 | 7/2003 | Yamazaki et al. |
| 2003/0134657 | A1 | 7/2003 | Norta et al. |
| 2003/0139205 | A1 | 7/2003 | Belcher et al. |
| 2003/0144793 | A1 | 7/2003 | Melaku et al. |
| 2003/0234979 | A1 | 12/2003 | Poo et al. |
| 2004/0036712 | A1 | 2/2004 | Cardno |
| 2004/0193369 | A1 | 9/2004 | Kokojima et al. |
| 2004/0201595 | A1 | 10/2004 | Manchester |
| 2004/0204125 | A1 | 10/2004 | Messel et al. |
| 2004/0266480 | A1 | 12/2004 | Hjelt et al. |
| 2005/0060088 | A1 | 3/2005 | Helal et al. |
| 2005/0113124 | A1 | 5/2005 | Syrjarinne et al. |
| 2005/0183118 | A1 | 8/2005 | Wee et al. |
| 2005/0222801 | A1 | 10/2005 | Wulff et al. |
| 2006/0052109 | A1 | 3/2006 | Ashman, Jr. et al. |
| 2007/0057067 | A1 | 3/2007 | He |
| 2007/0257836 | A1 | 11/2007 | Chaplin |

FOREIGN PATENT DOCUMENTS

| | | |
|---|---|---|
| CN | 1869863 A | 11/2006 |
| EP | 0564160 | 10/1993 |
| EP | 1355223 A | 12/2000 |
| EP | 1617629 A | 1/2003 |
| GB | 2420620 A | 5/2006 |
| WO | 9313604 | 7/1993 |
| WO | 99/22338 | 5/1999 |
| WO | 2005101028 A2 | 10/2005 |
| WO | 2005103863 | 11/2005 |
| WO | 2006028514 | 3/2006 |

OTHER PUBLICATIONS

Miniature MEMS Accelerometer Adds Motion Sensing to Consumer Products, Ashok Bindra Jun. 26, 2000.

MEMS Accelerometers for Motion Detection, Jim Pinto, Aug. 6, 2003.

MEMS, Stephanie Izarek, Apr. 3, 2001, PC Magazine.

Analog Devices Expands Low-G MEMS Portfolio with 3-Axis Accelerometer Technology for Portable Applications, Jan. 31, 2005, Business Wire.

Accelerometers: Jump into the Consumer Market, Michelle A. Clifford, Aug. 2004, Sensormag.com.

Office Action dated Mar. 17, 2008 in related case U.S. Appl. No. 10/903,225.

Office Action dated Oct. 15, 2008 in related case U.S. Appl. No. 10/903,225.

Advisory Action dated Nov. 13, 2008 in related case U.S. Appl. No. 10/903,225.

International Preliminary Report on Patentability and the Written Opinion of the International Searching Authority for PCT/US2006/029066 mailed Feb. 7, 2008.

First Office Action for Chinese Application No. 200680035001.3 dated Aug. 7, 2009, a foreign counterpart.

English Translation of First Office Action for Chinese Application No. 200680035001.3 dated Aug. 7, 2009, a foreign counterpart.

International Preliminary Report on Patentability and the Written Opinion of the International Searching Authority for PCT/US2007/071067 dated Dec. 22, 2008, a related application.

Non Final Rejection for U.S. Appl. No. 11/471,949 mailed Dec. 31, 2009, a related application.

Final Rejection for U.S. Appl. No. 11/471,949 mailed Jul. 8, 2009, a related application.

Non Final Rejection for U.S. Appl. No. 11/471,949 mailed Dec. 23, 2008, a related application.

International Search Report and the Written Opinion of the International Searching Authority for PCT/US2006/029066 mailed Jul. 12, 2006.

First Office Action for Chinese Application Serial No. 200580015277.0 dated Oct. 30, 2009, a foreign counterpart of U.S. Appl. No. 10/903,225.

English Translation of First Office Action for Chinese Application Serial No. 200580015277.0 dated Oct. 30, 2009, a foreign counterpart of U.S. Appl. No. 10/903,225.

Office Action for European Application Serial 05733020.1 dated Jul. 20, 2009, a foreign counterpart of U.S. Appl. No. 10/903,225.

International Report on Patentability and the Written Opinion of the International Searching Authority for PCT/ US2005/01097 mailed Jun. 24, 2008, a foreign counterpart of U.S. Appl. No. 10/903,225.

Reply Brief for U.S. Appl. No. 10/903,225 mailed Jul. 27, 2009, a related application.

Appeal Brief for U.S. Appl. No. 10/903,225 mailed on Feb. 13, 2009, a related application.

Notice of Allowance for U.S. Patent No. 7,611,061 mailed Jun. 15, 2009, a related application.

Non Final Office action for U.S. Patent No. 7,611,061 mailed Dec. 19, 2008, a related application.

Non Final Office action for U.S. Appl. No. 11/624,327 mailed Oct. 13, 2009, a related application.

Pedestrian Tracking with Shoe-Mounted Inertial Sensors by Eric Foxlin—IEEE Computer Graphics and Application. Nov./Dec. 2005.

Non Final Office Action for U.S. Appl. No. 11/478,963 mailed Apr. 2, 2009, a related application.

International Preliminary Report on Patentability and Written Opinion of the International Searching Authority for PCT/US2007/071089 mailed Jan. 6, 2009, a related application.

Final Office Action for U.S. Appl. No. 10/748,992 mailed Aug. 11, 2009, a related application.

Final Office Action for U.S. Appl. No. 10/748,992 mailed Jun. 14, 2007, a related application.

Non Final Office Action for U.S. Appl. No. 10/748,992 mailed Mar. 1, 2007, a related application.

Final Office Action for U.S. Appl. No. 10/748,992 mailed Sep. 20, 2005, a related application.

Reply Brief for U.S. Appl. No. 10/748,992 mailed Mar. 17, 2008, a related application.

Appeal Brief for U.S. Appl. No. 10/748,992 mailed Nov. 30, 2007, a related application.

Advisory Action for U.S. Appl. No. 10/748,992 mailed Aug. 28, 2007, a related application.

Reply Brief for U.S. Appl. No. 10/748,992 mailed May 30, 2006, a related application.

Appeal Brief for U.S. Appl. No. 10/748,992 mailed Feb. 21, 2006, a related application.

Advisory Action for U.S. Appl. No. 10/748,992 mailed Dec. 13, 2005, a related application.

Non Final Office Action for U.S. Appl. No. 11/472,243 mailed Jun. 11, 2009, a related application.

* cited by examiner

SYSTEM AND METHOD FOR MONITORING A MOBILE COMPUTING PRODUCT/ARRANGEMENT

BACKGROUND INFORMATION

Businesses and individuals today rely on mobile computing products/arrangements ("MCPs", e.g., bar code readers, PDAs, laptops, two-way pagers, mobile phones, digital cameras, mobile optical readers, vehicle radio computers ("VRCs"), etc.) in a multitude of situations ranging from basic everyday tasks to highly specialized procedures. As the virtues and benefits of utilizing MCPs continue to be realized across increasingly diverse industries, the features and capabilities of these products are expanding at a correspondingly rapid pace. In many industries, MCPs have gone from fashionable accessories to essential business components used by all levels of personnel.

In some industries, MCPs may be mounted on a vehicle or other motion based system (e.g., forklifts, cars, trucks, pallet jacks, mail trucks, hand carts, etc.). Placement of the MCP upon such vehicles may provide a user with immediate access to relevant information, such as a delivery address and/or a list of awaiting tasks. Further, the user may communicate information (e.g., a delivery confirmation, a current status of a workload, a present location, etc.) to others via the MCP. Although the placement of the MCP may be convenient in a number of respects, it may also present a potential for accidents. For example, a user/driver may be compelled to look at a display of the MCP and thus become distracted. Distractions, especially while the vehicle is in motion, may result in accidents (e.g., collisions).

SUMMARY OF THE INVENTION

A mobile computing arrangement having a sensor detecting first motion data of the arrangement and a memory to store second motion data, the second motion data including a threshold value. A comparison module compares the first motion data to the second motion data and an actuation module initiates an action for the arrangement when the first motion data exceeds the threshold value.

A method for detecting a motion of a mobile computing device, operating the mobile computing device in a first mode when the motion is less than a threshold value and operating the mobile computing device in a second mode when the motion is one of greater than and equal to the threshold value.

A motion based system having a vehicle for imparting a motion and a mobile computing device coupled to the vehicle. The mobile computing device includes a sensor detecting first motion data corresponding to the motion of the vehicle, a memory to store second motion data, the second motion data including a threshold value, and a processor to compare the first motion data to the second motion data and initiate an action for the mobile computing device when the first motion data exceeds the threshold value.

DETAILED DESCRIPTION

Figure 1:
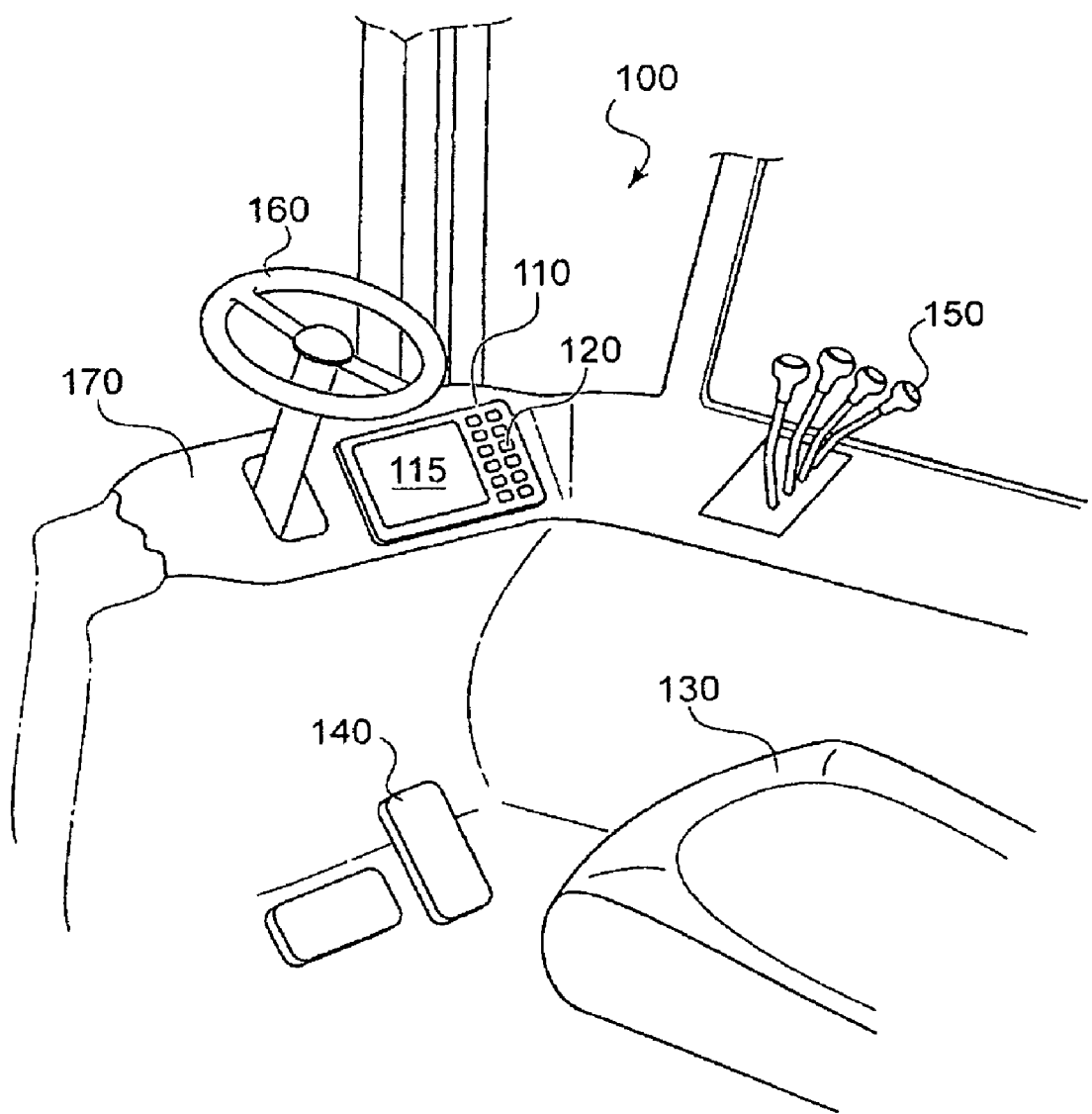
FIG. 1 shows an exemplary embodiment of a system according to the present invention.

The present invention may be further understood with reference to the following description and the appended drawings, wherein like elements are provided with the same reference numerals. The present invention relates to an MCP which includes a sensor that monitors the MCP's motion. The sensor does not require an input from a motion based system, e.g., an axle sensor, a speedometer, etc. In particular, the sensor may measure the MCP's acceleration, velocity, angular velocity or vibration in any direction. These measurements may be contrasted with prerecorded movement patterns or predefined levels of acceptable and unacceptable movement. As will be described below, predetermined procedures may then be executed that may be useful in a wide range of applications, including but not limited to accident prevention and power management.

FIG. 1 shows an exemplary embodiment of a motion based system 100, such as a forklift. An MCP 110 may be placed in view of an operator of the system 100 (e.g., on a dashboard 170 adjacent to a steering column 160). The MCP 110 may be any type of computer or processor based mobile device (e.g., a bar code reader, a PDA, a laptop, a two-way pager, a mobile phone, a digital camera, a mobile optical reader). Since the MCP 110 is mobile, it may be capable of connecting to a wireless network, and may be sized to be integrated into the motion based system 100. The MCP 110 may be battery powered or it may receive power from the motion based system 100.

The MCP 110 may include a display 115 and/or a keypad 120. The display 115 may be used to output information to the operator and/or to receive input therefrom. For example, the display 115 may portray a map of a route to be taken, an address, and/or a list of instructions. Additionally, a touch-panel may be integrated with the display 115 to enable the operator to input information. According to the present invention, the display 115 may toggle between a first mode (e.g., illuminated) and a second mode (e.g., a black screen) as a function of movement of the MCP 110 as will be explained below.

The operator, positioned in a seat 130, may maneuver the motion based system 100 using footpedals 140, gears 150, and/or the steering column 160. However, in the interest of safety, an operator should not use the MCP 110 while the motion based system 100 is moving. Thus, to prevent the operator from being distracted by the MCP 110 and to reduce a power usage of the MCP 110, the display 115 may not be illuminated while the system 100 is in motion. According to the present invention, the display 115 may automatically turn off (e.g., go black, initiate power save mode, etc.) when the MCP 110 determines that the motion based system 100 is moving.

Figure 2:
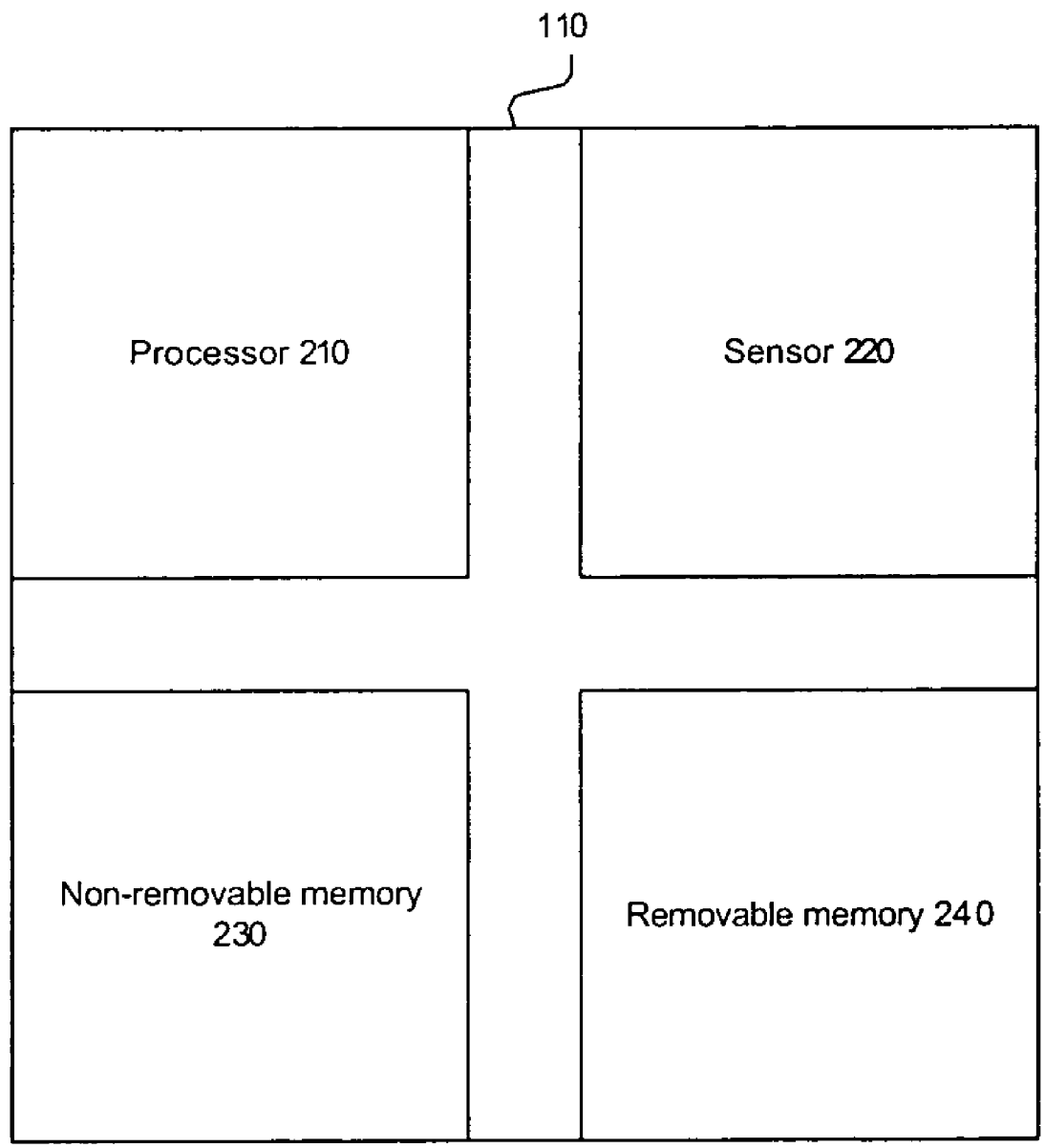
FIG. 2 shows an exemplary embodiment of a mobile computing product/arrangement according to the present invention.

FIG. 2 shows an exemplary embodiment of an MCP 110 according to the present invention. In this embodiment, the MCP 110 may include a processor 210, a sensor 220, a non-removable memory 230, and a removable memory 240. The processor 210 is a central processing unit ("CPU", that executes instructions on measurements taken by the sensor 220 and performs procedures such as storing a result in memory, transmitting the result to remote devices, or performing a predetermined task as a function of the result (e.g., turning off the display 115). The non-removable memory 230 is any type of memory component integrated into the electronic architecture of the MCP 110 and may be temporary (e.g., random access memory, or RAM) or permanent (e.g., a hard-disk drive). The removable memory 240 may be any type of detachable memory component that may connect to the MCP 110 through an expansion interface (e.g., a FLASH interface, a USB interface, a firewire interface, etc.).

In the exemplary embodiment of FIG. 2, the sensor 220 is integrated into the MCP 110. This sensor 220 may be a device coupled to an electronic architecture of the MCP 110 that dispatches data to a separate memory device, or it may be coupled to at least a portion of another device in the architecture. For instance, in the latter embodiment, the sensor 220 may be coupled to a memory arrangement in which event data (e.g., a first data of an event relating to the MCP 110 movement with values above a certain threshold) is stored. In an alternative exemplary embodiment, the sensor 220 may be a separate external device that connects to the MCP 110 through an expansion slot (e.g., a sensor with a FLASH, USB, firewire or similar interface).

The sensor 220 may be any type of measurement device capable of monitoring motion, and may be based on, for example, a G-shock sensor, a switch, an accelerometer, a strain gage, a piezo-electric sensor, Micro-Electro-Mechanical Systems ("MEMS") technologies, or combinations of the like. The motion may include, for example, a velocity value, an acceleration value, an angular velocity value, a mechanical vibration/shock value, etc. Although the sensor 220 may be of any size, the sensor 220 is preferably small enough so that any added weight and space occupied on the MCP 110 are negligible. Because the MCP 110 usually operates on batteries (e.g., its own battery or a battery utilized by the system 100), the sensor 220 should also have a low power consumption. As described above, the sensor 220 will detect motion for the MCP without an external input from the motion based system 100.

According to one embodiment of the present invention, the sensor 220 detects motion of the MCP 110 and generates first data. The first data is provided to the processor 210 which compares the first data to predetermined second data which includes a threshold value. For example, the second data may be a prerecorded acceleration of the MCP 110 by 0.5 m/s$^2$, the detection of which may indicate the occurrence of an event (i.e., the system 100 is moving). Subsequently, based on the first data, a particular predetermined procedure is selected and executed (e.g., the display 115 and/or the MCP 110 is turned off). This embodiment will be described in greater detail below with respect to FIG. 4.

Those of skill in the art will understand that the exemplary embodiments of the present invention are described with a general reference to translation motion (e.g., a forklift translates across a factory floor). However, other motion may be detected which indicate a different type of movement and/or action of the system 100. For example, if the system 100 includes a forklift and the forks are being moved up and down, this may cause a specific vibratory movement for the system 100 which may be detected by the sensor 220. Thus, the present invention is not limited to translation motion.

Figure 3:
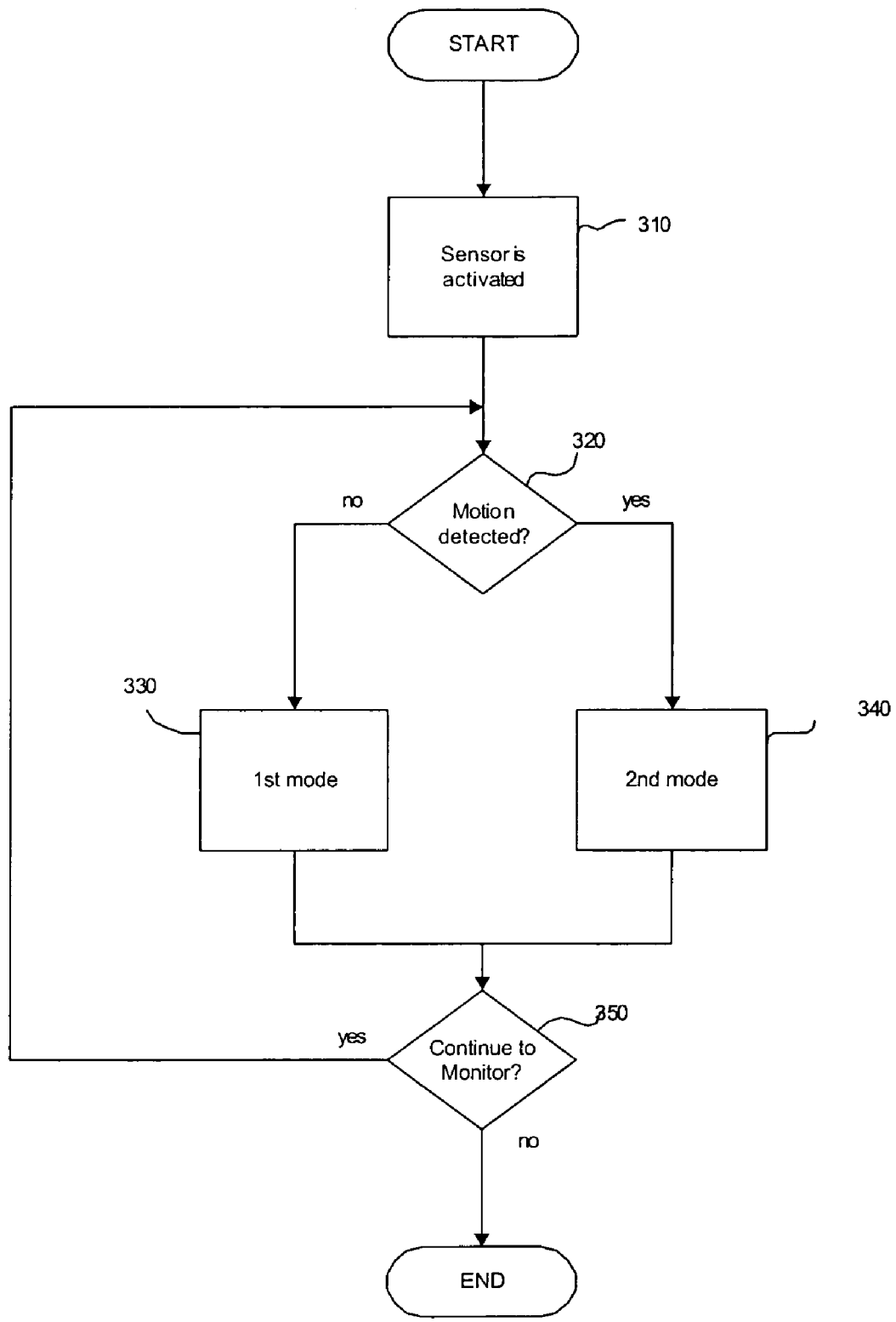
FIG. 3 shows an exemplary embodiment of a method for monitoring a mobile computing product/arrangement according to the present invention.

FIG. 3 shows an exemplary method for monitoring motion of the system 100 by the MCP 110. In the step 310, the sensor 220 of the MCP 110 is activated. The sensor 220 may be activated manually by the operator, or it may be activated upon receipt of a wireless transmission from a remote location (i.e., initiation is controlled by a separate network entity). In one embodiment of the present invention, the sensor 220 may be automatically activated each time the MCP 110 and/or the motion based system 100 is started and/or powered on. For example, the sensor 220 may remain activated even while the MCP 110 is in a power save mode.

In step 320, the sensor 220 determines whether motion is detected. The sensor 220 may measure the acceleration and/or the velocity of the MCP 110 and determine, based on the measurement, whether the system 100 is in motion. In one embodiment of the present invention, the system 100 may only be considered moving if it exceeds a predetermined velocity or acceleration, and/or if it continues to move for a predetermined period of time. For example, the sensor 220 may only determine that the system 100 is moving if it accelerates at 0.5 m/s$^2$ for more than 1.5 seconds. Thus, merely bumping into the system 100 may not register as movement.

In step 330, if the sensor 220 does not detect any movement of the MCP 110 in step 320, the MCP 110 may assume that the motion based system 100 is stationary, or that it is at least not moving as fast as a prerecorded threshold speed. Therefore, the MCP 110 remains in a first mode. The first mode represents a state of the MCP 110 where it is turned on and the display 115 is illuminated. Thus, an operator may use the MCP 110 when it is in the first mode.

In step 340, if the sensor 220 determines that the MCP 110 is moving in step 320, the MCP 110 switches to the second mode. The second mode represents a state where the display 115 of the MCP 110 is turned off, or in a "stand by" mode. However, it may be preferable to merely turn off the display 115 (e.g., by turning off a backlight) to facilitate re-illumination of the display 115 when the motion based system 100 slows down or stops.

It will be understood that the MCP 110 may enter the second mode due to other circumstances, which may or may not be defined by the user. For example, the MCP 110 may enter the second mode if there has been no user input for a predetermined amount of time. That is, the display 115 may turn off after a time in order to preserve a life of the display 115, the backlight, and/or the battery.

In step 350, the sensor 220 may continue to monitor the motion of the MCP 110. For example, in the embodiment where the second mode includes turning off the processor 210, monitoring may not be continued after the MCP 110 has entered the second mode. Further, reactivation of the MCP 110 may require the operator to re-authenticate, or "log in." However, in alternative embodiments the sensor system may continue monitoring, thus returning to step 320. For example, in the embodiment where the second mode only includes powering down the display 115, the sensor system may continue monitoring throughout a duration of the second mode. Thus, when the motion based system ceases moving, the MCP 110 may re-enter the first mode and the user may read the display 115. In a further embodiment, where the MCP 110 remains in the first mode, the sensor system may continue monitoring until at least some motion is detected and thus the MCP 110 enters the second mode. In an even further embodiment, the sensor system may continue monitoring until the MCP 110 and/or the motion based system is manually turned off.

Figure 4:
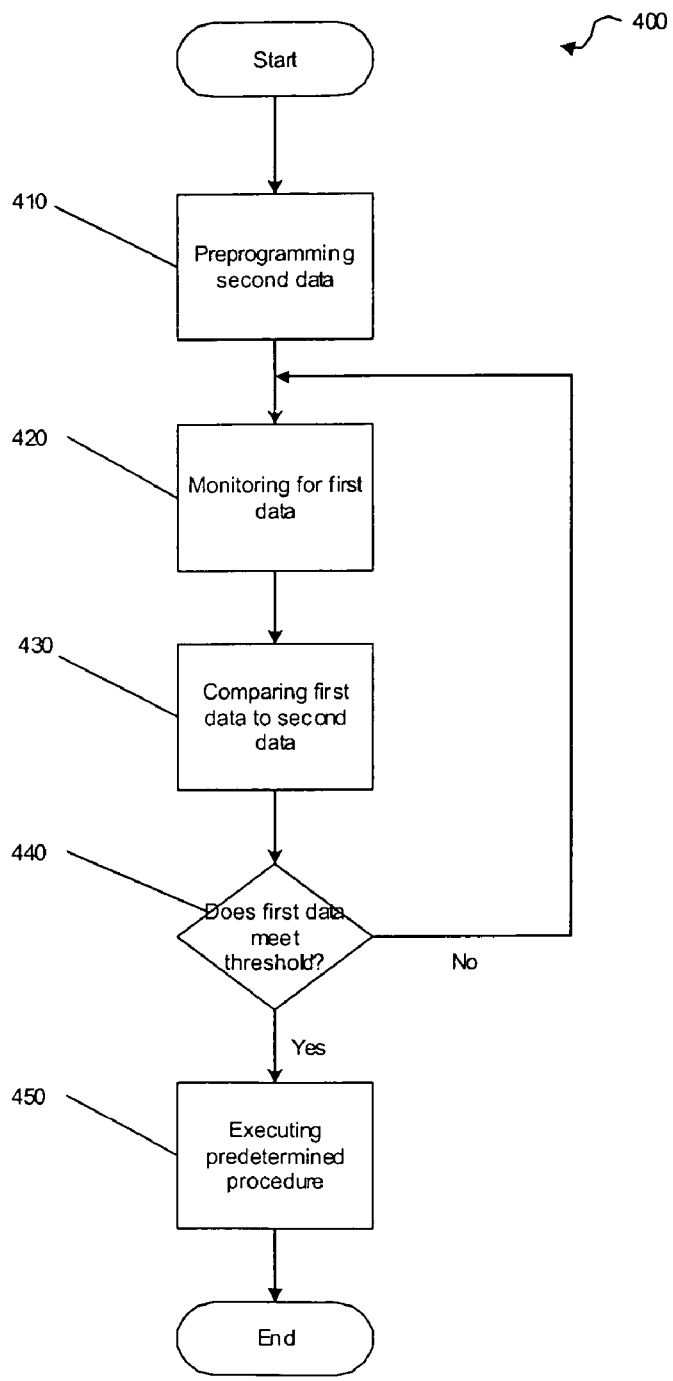
FIG. 4 shows another exemplary embodiment of a method for monitoring a mobile computing product/arrangement according to the present invention.

FIG. 4 shows an exemplary method 400 for monitoring the MCP 110 according to the present invention. In the step 410, certain distinct characteristics of events (e.g., the second data) are identified and programmed into the MCP 110. The second data may include a specific threshold value and/or a threshold range of changes in the motion of the MCP 110. The threshold value may correspond to the sensitivity of the sensor 220. For example, it may be desired that very slow motion, or quick short motions (i.e., indicating that the motion based system was merely bumped) do not cross the threshold value which would trigger a predetermined procedure.

The operator (e.g., the manufacturer, a system administrator or any other authorized person) may designate and/or modify the characteristics. For instance, the MCP 110 may be prepackaged by the manufacturer with static acceleration maximum values that are inaccessible or not editable by the user. Alternatively, the threshold may simply be dynamic default values adjustable to future specifications.

In the step 420, the MCP 110 is continuously monitored by the sensor 220 for changes in the motion/movements. Whenever the MCP 110 detects motion, the first data is generated. The sensor 220 may make no effort to differentiate between or prioritize motion values, returning all results to the processor 210 for processing.

In the step 430, the processor 210 compares the first data with the second data. If the characteristics of the first data match those of the second data, the processor 110 determines that an event has occurred (i.e., the MCP 110 is in motion). Thus, the method 400 continues to the step 450, where the predetermined procedure is executed. The execution of the predetermined procedure may depend upon an application of the present invention. For example, the backlight of the MCP 110 may be turned off and/or the MCP 110 may be powered down.

Other examples of predetermined procedures include storing the first data in one of memory devices 230, 240, encrypting the first data so that it may be accessible only by an authorized user, transmitting the first data to a remote computer, issuing alerts as to the MCP 110's status, etc. After the predetermined procedure has been successfully executed, the method 400 may resume again at the step 420 to monitor for new event occurrences.

As previously mentioned, the predetermined procedure may vary depending on the specific application of the present invention. For example, in accident prevention, it may be desirable to alert the user through visible warning (e.g., on-screen precautionary displays, flashing LEDs) or audible sirens (e.g., using a speaker, headset, receiver) that the display 115 will turn off momentarily. Also, it may be desirable to notify the operator if important information is transmitted to the MCP 110 while it is in the second mode. For example, if the motion based system 100 is moving, and thus the display 115 is off, it may nonetheless be desired to communicate with the operator. Thus, a visible and/or audible alert may indicate that the operator should halt the vehicle in order to enable illumination of the display 115, which would in turn enable receipt of the information.

Although the exemplary applications of the present invention in foregoing description have primarily focused on accident prevention, the present invention may also be used in a variety of other settings. As described below, these settings include, for example, power management.

The power management properties of MCPs have always been a primary focus of product design engineers. Due to their limited size and weight and their mobile nature, MCPs usually have limited power supplies (e.g., rechargeable or disposable battery packs). Developing MCPs that operate for long periods of time, without sacrificing mobility, is an ongoing design challenge. Designing a robust power management system that optimizes and conserves power is a critical element in addressing this challenge. An MCP 110 may have a backlight and a display, which consume a significant amount of power when turned on. According to the present invention, these devices may be turned off when the MCP 110 is in motion, thereby conserving power.

The present invention has been described with reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A mobile computing arrangement, comprising:
   a sensor detecting first motion data of the arrangement;
   a memory to store second motion data prior to detecting the first motion data, the second motion data including a threshold value; a comparison module to compare the first motion data to the second motion data;
   an actuation module to initiate an action for the arrangement when the first motion data exceeds the threshold value; and
   a display screen, wherein the action is one of turning off a backlight of the display screen and turning off the display screen.

2. The mobile computing arrangement of claim 1, wherein the display screen includes a touch screen.

3. The mobile computing arrangement of claim 1, wherein the first motion data is one of an acceleration, a velocity, an angular acceleration, an angular velocity and a vibration.

4. The mobile computing arrangement of claim 1, wherein the arrangement is part of a motion based system.

5. The mobile computing arrangement of claim 1, wherein the sensor is coupled to a bus of the arrangement.

6. The mobile computing arrangement of claim 1, wherein the sensor is coupled to the arrangement via one of a flash connection, a USB connection, a serial connection, a parallel connection and a firewire connection.

7. The mobile computing arrangement of claim 1, wherein the sensor includes one of a G-shock sensor, a switch, an accelerometer, a strain gauge, a piezo-electric sensor and a MEMS.

8. The mobile computing arrangement of claim 1, wherein the second motion data includes a plurality of thresholds, each threshold corresponding to a defined type of movement of the arrangement.

9. The mobile computing arrangement of claim 1, wherein the threshold includes a time component.

10. A method, comprising:
    storing a threshold value related to a motion of a mobile computing device;
    detecting the motion of the mobile computing device;
    operating the mobile computing device in a first mode when the motion is less than the threshold value; and
    operating the mobile computing device in a second mode when the motion is one of greater than and equal to the threshold value, wherein the first mode includes providing full power to a display screen of the mobile computing device and the second mode includes providing less than full power to the display screen.

11. The method of claim 10, wherein the mobile computing device is included in a motion based system.

12. The method of claim 10, wherein the threshold is based on data stored in the mobile computing device.

13. The method of claim 10, wherein less than full power includes one of no power to the display screen and no power to a backlight of the display screen.

14. The method of claim 10, wherein the motion is one of an acceleration, a velocity, an angular acceleration, an angular velocity and a vibration.

15. The method of claim 10, wherein the motion is detected by a sensor including one of a G-shock sensor, a switch, an accelerometer, a strain gauge, a piezo-electric sensor and a MEMS.

16. A motion based system, comprising:

a vehicle for imparting a motion; and a mobile computing device coupled to the vehicle, wherein the mobile computing device includes; a sensor detecting first motion data corresponding to the motion of the vehicle, a memory to store second motion data prior to detecting the first motion data, the second motion data including a threshold value, and a processor to compare the first motion data to the second motion data and initiate an action for the mobile computing device when the first motion data exceeds the threshold value, wherein the mobile computing device further includes a display screen and the action is one of turning off a backlight of the display screen and turning off the display screen.

17. The motion based system of claim 16, wherein the motion is one of an acceleration, a velocity, an angular acceleration, an angular velocity and a vibration.

18. The motion based system of claim 16, wherein the sensor includes one of a G-shock sensor, a switch, an accelerometer, a strain gauge, a piezo-electric sensor and a MEMS.

* * * * *

UNITED STATES PATENT AND TRADEMARK OFFICE
CERTIFICATE OF CORRECTION

PATENT NO. : 7,822,513 B2
APPLICATION NO. : 11/190246
DATED : October 26, 2010
INVENTOR(S) : Wulff Page 1 of 1

It is certified that error appears in the above-identified patent and that said Letters Patent is hereby corrected as shown below:

On the Title Page
1. On Page 2, Item (56), under "FOREIGN PATENT DOCUMENTS", Line 3, delete "12/2000" and insert -- 10/2003 --, therefor.

2. In Column 2, Line 61, delete "("CPU"," and insert -- ("CPU") --, therefor.

3. In Column 6, Lines 19-20, in Claim 1, delete "screen and turning off the display screen." and insert -- screen, turning off the display screen and placing the display screen in a standby mode. --, therefor.

4. In Column 8, Lines 5-6, in Claim 16, delete "screen and turning off the display screen." and insert -- screen, turning off the display screen and placing the display screen in a standby mode. --, therefor.

Signed and Sealed this
First Day of May, 2012

David J. Kappos
*Director of the United States Patent and Trademark Office*